United States Patent [19]

Fujii et al.

[11] Patent Number: 4,680,157

[45] Date of Patent: Jul. 14, 1987

[54] METHOD FOR THE PREPARATION OF A CRYSTALLINE THERMOPLASTIC RESIN SHEET

[75] Inventors: Atsushi Fujii, Kisarazu; Kazuhisa Kaneda; Yoshihiro Tokiya, both of Ichihara, all of Japan

[73] Assignee: Idemitsu Petrochemical Co., Ltd., Tokyo, Japan

[21] Appl. No.: 757,076

[22] Filed: Jul. 19, 1985

[30] Foreign Application Priority Data

Jul. 25, 1984 [JP] Japan ................................ 59-153206
Jul. 27, 1984 [JP] Japan ................................ 59-155520

[51] Int. Cl.$^4$ ............................................. B29C 47/88
[52] U.S. Cl. ................................... 264/180; 264/557; 264/562; 264/210.3; 264/235; 425/71
[58] Field of Search ..................... 264/180, 235, 288.4, 264/290.2, 280, 210.3, 562, 175, 178 R, 557; 425/71

[56] References Cited

U.S. PATENT DOCUMENTS

| | | | |
|---|---|---|---|
| 2,728,951 | 1/1956 | O'Hanlon et al. | 264/178 R |
| 3,119,151 | 1/1964 | Corbett | 425/71 |
| 3,175,026 | 3/1965 | James | 264/210.2 |
| 3,199,148 | 8/1965 | Koppehele | 425/71 |
| 3,231,557 | 1/1966 | Bauer | 264/288.4 |
| 3,257,490 | 6/1966 | Hovermale et al. | 264/290.2 |
| 3,328,503 | 6/1967 | Ancker | 264/175 |
| 3,361,728 | 1/1968 | Coen et al. | 264/216 |
| 3,402,428 | 9/1968 | Schreiber | 425/71 |
| 3,465,070 | 9/1969 | Smith | 264/210.2 |
| 3,717,425 | 2/1973 | North et al. | 425/71 |
| 3,822,333 | 7/1974 | Haruta et al. | 264/178 R |
| 3,862,285 | 1/1975 | North et al. | 264/180 |
| 4,078,033 | 3/1978 | Czerwon et al. | 425/71 |
| 4,548,778 | 10/1985 | Fujii | 264/180 |

FOREIGN PATENT DOCUMENTS

| | | |
|---|---|---|
| 17689 | 4/1982 | Japan . |
| 128673 | 11/1982 | Japan . |
| 168664 | 12/1982 | Japan . |
| 151632 | 9/1983 | Japan . |
| 57720 | 4/1984 | Japan . |
| 44319 | 3/1985 | Japan . |

Primary Examiner—Jeffery Thurlow
Attorney, Agent, or Firm—Frishauf, Holtz, Goodman & Woodward

[57] ABSTRACT

The invention provides a method for the preparation of a sheet of a crystalline thermoplastic resin, e.g. polypropylene, having excellent transparency and surface properties as well as thermoformability. The inventive method comprises quenching of a molten resin sheet extruded out of a T-die by introducing the same into a slit where cooling water is flowing at a velocity higher than the running velocity of the extruded molten resin sheet and then stretching the thus quenched resin sheet in a stretch ratio in the range from 1.02 to 1.5 times.

8 Claims, No Drawings

METHOD FOR THE PREPARATION OF A CRYSTALLINE THERMOPLASTIC RESIN SHEET

BACKGROUND OF THE INVENTION

The present invention relates to a method for the preparation of a crystalline thermoplastic resin sheet or, more particularly, to a method for the stable and high-speed preparation of a crystalline resin sheet having excellent transparency, high gloss and uniformity which can be used as such for the fabrication of a paper folder and the like cardboard products or for the fabrication of various boxes and containers utilizing the excellent thermoformability thereof.

Conventional thermoplastic resin sheets of high transparency used hitherto are mostly made of a non-crystalline or amorphous resin such as a polyvinyl chloride resin, polystyrene-based resin and the like. Sheets of these amorphous thermoplastic resins have excellent thermoformability so that they are widely used in the fabrication of various boxes and containers useful in many fields. Among these amorphous thermoplastic resins, however, polyvinyl chloride resins are disadvantageous in respects of hygiene, heat resistance, moisture proofness and other properties. Moreover, wastes of the resin cannot be disposed without the very serious problem of environmental pollution, for example, due to the emission of chlorine-containing gases in the course of incineration for disposal. Polystyrene-based resins are also not quite satisfactory in respects of the heat resistance, impact strength, moisture-proofness and other properties. Notwithstanding these disadvantages and problems, sheets of these amorphous thermoplastic resins are widely used as a packaging material in many fields solely by virtue of their excellent transparency.

Accordingly, it is a recent trend to convert the base resin of the sheets from the above mentioned amorphous thermoplastic resins to a crystalline resin having excellent mechanical strength and heat resistance. Crystalline thermoplastic resins are, of course, inferior in the transparency due to the crystallinity. Although the transparency of a crystalline thermoplastic resin sheet can be increased by quenching in cold water, appearance of haze dots is unavoidable in the sheet which has been quenched so that such a quenched sheet is no longer acceptable with its poor appearance to be utilized as such and difficulties are also encountered when such a sheet is to be used as a packaging material in the form of a box or other container.

Nevertheless, polypropylene-based resins, for example, are increasingly used in recent years in place of the polyvinyl chloride resins and polystyrene-based resins by virtue of their excellent strength, rigidity, heat resistance, moisture proofness and other properties. They are, however, far from satisfactory when transparency is an essential characteristic of the resin sheet and the applicability of these resins is greatly limited also owing to their relatively low rigidity and thermoformability in comparison with the above mentioned amorphous thermoplastic resins. In particular, the low transparency so far thereof is the determinant factor for the absence of competitiveness with the amorphous resins.

Various attempts and proposals have been made hitherto to improve the transparency of a polypropylene sheet. In connection with the quenching method of an extruded sheet of a molten resin to control the crystalline structure thereof, for example, following methods have been proposed.

The first is the chill roll method which is, however, not suitable when quenching is desired down to a temperature below the dew point because dew drops are deposited on the surface of the chill roll which is at a temperature below the dew point. In addition to the above mentioned limitation in respect of quenching, no resin sheet of excellent surface condition can be obtained by this method because air is unavoidably caught between the roll surface and the running molten resin sheet, especially, in high-speed molding.

The second of the proposals is the water quenching method. Although a high quenching effect can be obtained in a conventional water quenching method, the difficulty in obtaining uniformity in the quenching effect frequently results in the appearance of boiling dots and haze dots in the quenched resin sheet. Therefore, sufficiently uniform resin sheets can be obtained only at an extremely low molding velocity.

Thirdly, the method of slit water quenching has been proposed which, although the method is advantageous in respect of the efficiency of quenching and uniformity of quenching, is not always quite satisfactory because the method is not suitable for highspeed molding and not free from the problems of haze dots and stripes, unevenness in the thickness of the sheet, macroscopic undulation on the surface of the sheet and curling of the sheet.

Furthermore, following methods have been proposed for the improvement of the transparency of polypropylene resin sheets.

Thus, the fourth method is the use of a resin admixed with a nucleating agent but this method is not free from the problems of bleeding of the nucleating agent on the surface of the sheet as well as the unpleasant or offensive odor and toxicity thereof in addition to the limited improvement of the transparency.

The fifth method is the use of a resin blended with a petroleum resin. This method is, however, disadvantageous due to the decrease in the heat resistance and moisture proofness inherent to the polypropylene resins in addition to the limited improvement of the transparency of the sheet.

For these reasons, the trend of the technology is in the direction of improving the transparency of the containers shaped of the resin sheet by thermoforming and not in the direction of improving the transparency of the polypropylene resin sheet per se.

The sixth method, i.e., Japanese Patent Publication 57-17689 discloses a method for the fabrication of a transparent container of a polypropylene resin sheet by pressure forming at a temperature lower than the melting point thereof after heating of the resin sheet at a temperature of the melting point or higher followed by quenching. In this method, however, the resin sheet shaped in advance is reheated so that disadvantages are unavoidable in the degradation of the resin by the second heating and unevenness in heating if not to mention the costs for the increased energy consumption. Moreover, another problem is in the difficulty of obtaining uniform quenching which results in an insufficient degree of improvement in the transparency of the sheet and formation crimps and slackenings in the resin sheet in the course of the thermoforming.

A seventh method has been proposed in which a thermoplastic resin sheet is imparted on both surfaces with a surface roughness of 0.7 μm RMS or smaller and the resin sheet is unidirectionally stretched in a stretch ratio of 3 times or less followed by thermoforming (see, for example, Japanese Patent Kokai No. 53-128673). This method, however, has no contribution at all to the improvement of the internal haze in addition to the difficulty in reducing the surface roughness on both of the surfaces of the sheet. Therefore, the resin sheet treated by this method cannot have a sufficiently improved transparency. Moreover, this method is effective in the improvement of the transparency only when the stretch ratio is as high as 1.5 to 2.5 times while such a high stretch ratio is detrimental greatly to the thermoformability of the resin sheet. In addition, the transparency can be increased only by a deep drawing to some extent so that tearing of the sheet in the MD direction and non-uniformity in the transparency are unavoidable as a result of the unevenness in drawing. The resin sheet obtained by this method has a relatively low heat resistance due to the orientation therein so that the sheet is not suitable for fabrication by vacuum forming which necessitates a relatively high thermoforming temperature.

As is understood from the description given above in detail, in the prior art, there are known absolutely no sheet products of a crystalline thermoplastic resin or, in particular, polypropylene-based resin having excellent transparency and surface properties along with low orientation and excellent thermoformability.

SUMMARY OF THE INVENTION

It is therefore an object of the present invention to provide a novel method for the preparation of a resin sheet free from the above described problems and disadvantages in the prior art methods, according to which a sheet material of a crystalline thermoplastic resin having good transparency and high gloss comparable to those of a polyvinyl chloride resin sheet and excellent thermoformability can readily be obtained even by slightly stretching.

Thus, the method of the present invention for the preparation of a crystalline thermoplastic resin sheet comprises the steps of: (a) extruding a melt of a crystalline thermoplastic resin into a sheet; (b) quenching the thus extruded molten resin sheet by introducing the same into a slit where cooling water is flowing; and (c) stretching the thus quenched resin sheet at a temperature lower than the melting point of the resin in a stretch ratio in the range from 1.02 to 2.00 times.

DETAILED DESCRIPTION OF THE PREFERRED EMBODIMENTS

In the method of the invention, various types of crystalline thermoplastic resins can be used as the starting base resin of the sheet including polyolefins such as polypropylenes, random or block copolymers of propylene and an α-olefin of 30% by moles or less, polyethylenes, random copolymers of ethylene and an α-olefin of 30% by moles or less, polybutenes and the like; polyesters such as poly(ethylene terephthalate), poly(butylene terephthalate) and the like; polyamides such as nylon 6, nylon 6,6, nylon 6,10 and the like; poly(phenylene sulfide); polyether ether ketones and others. Among them, particularly satisfactory results can be obtained by use of a polyolefin resin or, in particular, a polypropylene-based resin. The polypropylene-based resin here implied is exemplified, preferably, by homopolymers of propylene, random copolymers of propylene and an α-olefin and mixtures thereof. The polypropylene-based resin should have a melt index in the range from 0.2 to 20 g/10 minutes or, preferably, from 0.3 to 15 g/10 minutes. When the melt index of the resin is lower than 0.2 g/10 minutes, disadvantages are caused by the unduly low rigidity of the resin sheet to be obtained in addition to the decrease in the productivity due to the decreased rate of extrusion out of the extruder machine. When the melt index is higher than 20 g/10 minutes, on the other hand, difficulties are encountered in shaping of the sheet due to the unduly low melt viscosity. It is optional that the starting base resin is admixed according to need with various kinds of additives including nucleating agents, lubricants, antioxidants, ultraviolet absorbers, radiation resistance agents, antistatic agents, coloring agents and the like. The nucleating agent above mentioned is exemplified by aromatic and aliphatic carboxylic acids, dibenzylidene sorbitol, silica flour, talc and the like. Further, the base resin may be blended with a petroleum resin, adhesive resin, elastomer and the like.

The first step of the inventive method is the melt-extrusion of the above described crystalline thermoplastic resin in the form of a sheet. The most conventional method for the melt-extrusion of a resin is the use of a screw extruder machine in which the resin feed is continuously melted and kneaded and then the resin melt is extruded through a T-die in the form of a sheet. As to the type of the extruder used in the inventive method, it is preferable to use a machine free from the problem of an excessively large shearing stress which is capable of kneading and extruding at a relatively low resin temperature and provided with a screw having a sufficiently large space for stress relaxation at the front end of the extruder machine.

Although the extrusion is basically performed of a single kind of the thermoplastic resin into an extruded sheet, it is optional, if desired, to perform bilayer or multilayer coextrusion using a combination of different resins by use of two or more extruder machines. The resins to be combined are, for example, a homopolymerized polypropylene and a random-polymerized polypropylene, polypropylenes having different values of melt index, a polypropylene and an adhesive polyolefin modified with an unsaturated carboxylic acid or a derivative thereof, a polypropylene and a polyethylene or an ethylene-vinyl acetate copolymer, a polypropylene and an ethylene-vinyl alcohol copolymer, and the like.

It is essential in the inventive method that the extrusion is performed under such conditions that the extruded sheet still in a molten state at the exit of the T-die has high transparency and smooth surfaces and is subject to little swelling with sufficiently relaxed stress. To say particularly, the extruder machine should be provided with a screw composed of a low-compression screw part, shearing part and stress-relaxation part and the extrusion is performed by keeping the resin at a somewhat lower temperature and after the stress has been relaxed. The temperature at the die exit should be controlled by use of a die-lip heater to be higher by 10° to 60° C. than the resin temperature. The die should be free of mars and scratches on the surface so as to give an extrusion-molded sheet having smooth surfaces and excellent transparency.

In the next step, the thus extruded transparent resin sheet is quenched by introducing the same into a slit where cooling water is flowing. Namely, cooling water is supplied to the slit to flow therethrough and the extruded resin sheet still in a molten state is introduced into the slit along the flowing direction of the cooling water to effect quenching. In this case, the flowing velocity of the cooling water through the slit should be larger than the running velocity of the resin sheet therethrough or, preferably, the flowing velocity of the cooling water should be twice or more than that of the resin sheet. The material forming the slit is not particularly limitative and suitable materials include metals, plastics, wood, fabrics and the like provided, if necessary, with a coating layer of plated or vacuum-deposited metal, polytetrafluoroethylene and the like. The slit here implied is formed of a pair of oppositely facing surfaces with a narrow gap therebetween and the structure thereof is not particularly limitative. For example, the slit may be formed of a pair of oppositely facing endless belts or of a pair of rollers. Preferably, two stages or more of slits are provided so that the effect of quenching is further increased to give high-quality products with high productivity. Slits disclosed in the specification and the drawings of the U.S. patent application Ser. No. 535,661 filed September 26, 1983 now U.S. Pat. No. 4,548,778, can be utilized as a preferable slits. The width of the slit is not particularly limitative but, in particular, the first-stage slit should have a width of 20 mm or smaller or, preferably, 10 mm or smaller or, more preferably, 6 mm or smaller. The height of the slit should be at least 3 mm or, preferably, at least 5 mm.

In supplying the cooling water to the first-stage slit, it is preferable to avoid contacting of the running molten resin sheet with the surface of the cooling water which is stagnant or in a low flowing velocity forming a pool on the upper part of the slit. It is essential therefor to maintain the level of the cooling water in the upper part of the slit at an as low level as possible. Furthermore, it is important to provide a control means so that the first contacting line between the cooling water and the running molten resin sheet should be uniform and without fluctuation. Although the above mentioned conditions are important in the first-stage slit for the initial quenching in the slit water-quenching according to the inventive method, the influences of the conditions of the water stream are less significant in the second-stage and subsequent slits so that no particular control means may be provided for the water level and flow velocity.

Water containing no particular additive may be used as the cooling water but it is optional that the cooling water is admixed with a surface active agent or an organic or inorganic thickening agent when improvements in the uniformity of quenching and smoothness of the surfaces of the resin sheet are desired.

As organic thickening agents, various compounds such as natural polymeric substances, and synthetic substances (including semi-synthetic substances) can be used.

Examples of natural polymeric substances include starches such as potato starch, sweet potato starch, wheat starch, etc.; mannans such as konnyaku; seaweeds such as agar, sodium alginate, etc.; viscous substances originated in plant such as tragacanth gum, gum arabi, etc.; viscous substances originated in microorganism such as dextrin, levan, etc.; and proteins such as glue, gelatin, casein, collagen, etc. Examples of semi-synthetic substances include celluloses such as viscose, methyl cellulose, carboxymethyl cellulose, etc.; starch substances such as soluble starch, carboxymethyl starch, dialdehyde starch, etc. Examples of synthetic substances include polyethylene glycol, polyvinyl alcohol, polymer of sodium acrylate, polyethylene oxide, etc.

Examples of inorganic thickening agents are silica sol, alumina sol, clay, water glass, and various metal salts.

The viscosity of an aqueous solution of an organic or inorganic thickening agent is from 2 to 3,000 centipoises and preferably from 3 to 1,000 centipoises.

In the present invention, the cooling water is used to cool the sheet-shaped thermoplastic resin. The temperature of the cooling water is suitably within the range of from $-10°$ to $+50°$ C. In the production of sheet having a thickness of at least 0.2 millimeter, the formation of haze dots can be effectively prevented by controlling the temperature of the cooling water to 20° C. or lower and preferably 10° C. or lower. In this manner, a crystalline thermoplastic resin sheet is obtained by quenching the molten resin sheet to a temperature of, usually, 100° C. or below or, preferably, 60° C. or below. Although the above described quenching in the inventive method is effective in obtaining a resin sheet having excellent transparency, the degree of the effect obtained by quenching depends on the thickness of the resin sheet. For example, the haze of a resin sheet having a thickness of 0.5 mm or smaller can be 10% or smaller or, in some cases, 5% or smaller. It is, however, possible to fabricate a transparent box or container by the subsequent thermoforming of the resin sheet regardless of the thickness of the sheet when the sheet has an external haze of 5% or less. Accordingly, it is desirable to control the conditions of extrusion and water quenching so that the extruded and quenched resin sheet should have an external haze of 5% or less.

The next step imparted is the stretching of the thus obtained resin sheet imparted with excellent surface condition and crystalline state by the well controlled quenching treatment at a temperature lower than the melting point of the crystalline thermoplastic resin in a stretch ratio in the range from 1.02 to 2.00 times to give a resin sheet of excellent transparency. In performing the stretching treatment, the resin sheet is heated at a temperature lower by 5° to 70° C. or, preferably, 5° to 50° C. than the melting point of the resin and subjected to stretching or rolling. This roll stretching can be carried out by stretching the sheet between rollers rotating at different speeds. Heating of the resin sheet can be performed continuously by a conventional method such as hot air heating, radiation heating, passing on a hot roll and the like. The stretching may be either uniaxial or biaxial although quite satisfactory results can be obtained usually by uniaxial stretching. The stretch ratio should be in the range from 1.02 to 2.00 times or, preferably, in the range from 1.03 to 1.50 times although the optimum stretch ratio depends on the temperature and manner of stretching and should be determined according to the intended application, thickness of the sheet and other factors. Stretching of the sheet can be performed in several different ways with no particular limitation. For example, rolling is preferred when the resin sheet as such is used as a base material of paper folders, bent-sheet boxes and the like products since the method is effective in eliminating the fine die lines and other defects on the surface of the sheet. The rolling of a resin sheet is performed by passing the sheet through a narrow gap smaller than the thickness of the sheet between a pair of rollers each having a smooth surface with a low surface roughness and rotating in a reverse direction to the other. When the resin sheet is to be used in the fabrication of a container by thermoforming at a temperature below the melting point of the resin, the preferable stretch ratio is in the range from 1.02 to 2.00 times for pressure molding and in the range from 1.02 to 1.10 times for vacuum forming. A shrinking stress of 0.2 to 30 kg/cm$^2$ is usually sufficient by this stretching of the resin sheet though dependent on the conditions of stretching. Namely, stretching of only a very low degree is sufficient in the inventive method because the purpose of the stretching is not only to improve the transparency of the resin sheet but to eliminate curlings and crimps in the quenched sheet and to prevent formation of slackening and crimps in the course of the thermoforming.

It is optional in the method of the invention that the above described step of stretching is preceded by a heat treatment of the quenched resin sheet. Namely, a step of heat treatment is added between the quenching step, in which the molten resin sheet is quenched by being introduced into a slit where cooling water is flowing, and the step of stretching.

The heat treatment here implied is performed by heating the resin sheet using a hot roller, hot air, hot inert liquid and the like at a temperature lower than the melting point of the base resin by 10° to 60° C. or, preferably, by 20° to 50° C. In other words, this heat treatment has an effect of annealing and contributes to the further improvement of the transparency and rigidity of the resin sheet.

According to the method described above in detail, a crystalline thermoplastic resin sheet can be obtained which is excellent in the transparency, surface properties and appearance and has good formability suitable for the fabrication of containers by the techniques of vacuum and/or pressure forming. The thickness of the resin sheets which can be manufactured by the inventive method is not limited to a particular range but may include a thickness in the range from 0.05 to 2 mm or, preferably, from 0.1 to 1 mm. When the thickness of the sheet is 0.5 mm or smaller, the lowest value of the haze is 20% or below or, in some cases, 10% or below.

The crystalline thermoplastic resin sheet prepared by the inventive method has transparency and appearance quite different from those of the conventional crystalline thermoplastic resin sheets and, when the thermoplastic resin is a polypropylene resin, is not distinguishable by the appearance alone from the sheets of polyvinyl chloride resins and polystyrene-based resins. In addition to the indistinguishableness of appearance from the conventional amorphous thermoplastic resin sheets, the resin sheet prepared by the inventive method is excellent in strength or, in particular, strength against bending and folding and in the absence of the phenomenon of whitening so that the application of the resin sheet of the invention is not limited to paper folders and other stationery products, which have been conventionally fabricated of the amorphous thermoplastic resin sheets, but includes various containers fabricated by bending and folding of a resin sheet and many other fields as a possibility of future development.

The crystalline thermoplastic resin sheet prepared by the inventive method can be quite satisfactorily used in the fabrication of various kinds of molded articles such as containers by a known technique of thermoforming such as vacuum forming, pressure forming, plug assist pressure forming, matched-mold thermoforming and the like at a temperature below the melting point of the resin or, usually, at a temperature lower than the melting point by 5° to 50° C. The thermoforming can be performed at a relatively high temperature by virtue of the unique characteristic features of the resin sheet prepared by the inventive method including the high transparency already imparted to the sheet, the fine crystallite size in the resin sheet controlled by means of the quenching and the very low degree of stretching, i.e. very low degree of orientation, in the sheet which means the good thermoformability of the resin sheet. The shape reproducibility in the thermoforming is excellent even under a relatively low forming pressure as in the vacuum forming which is quite satisfactorily applicable to the resin sheet of the invention. Therefore, relatively simple and inexpensive forming machines and molds can be used in the thermoforming of the resin sheet by the inventive method. In comparison with conventional crystalline thermoplastic resin sheets in which transparency can be exhibited only by the stretching, and orientation in the course of the thermoforming, the resin sheet prepared by the inventive method is highly transparent a such so that no stretching and orientation of the resin sheet may be involved in the thermoforming and highly uniform containers without unevenness in the transparency can be fabricated of the resin sheet including shallow containers and deep-drawn containers as well as containers of complicated forms. Furthermore, the low degree of orientation in the thus fabricated containers gives an advantage of a high temperature of the incipient heat shrinkage of the container in use so that development of the application thereof to new fields can be expected such as the packaging container of a retortpouched food and the container for melt-filling packaging of a heat-flowable food such as candies. Needless to say, the above mentioned applications are only several of special uses and the resin sheet prepared by the inventive method can be used quite satisfactorily in the fabrication of containers for foods and beverages in general, containers for press-through-package of medicines and confections, containers for blister package and the like.

In the following, the method of the present invention is described in more detail by way of examples.

EXAMPLES 1 to 7

An isotactic polypropylene having a melting point of 168° C. and a melt index of 2.0 g/10 minutes was melted and extruded into a transparent molten resin sheet at a resin temperature of 250° C. out of a T-die of 550 mm width and a die lip opening of 1 mm provided with a die lip heater and mounted on an extruder machine having a diameter of 65 mm and L/D=28. The extruded molten resin sheet was introduced into a water quenching unit A or B described below in which the molten resin sheet was quenched into a polypropylene resin sheet under the conditions shown in Table 1. The resin sheet was then heated to 130° C. on a heating roller and stretched in a stretch ratio indicated in Table 1 to give a stretched polypropylene resin sheet. The tensile modulas of the thus stretched resin sheet was 19000 kg/cm$^2$.

The stretched resin sheet was subjected to thermoforming in the conditions indicated in Table 1 to evaluate the formability of the resin sheet and the quality of the thermoformed containers to give the results shown in Table 1.

Water quenching unit A (single-stage slit)

The slit had a height of 50 mm and a width of 3 mm and the water level of the water pool above the slit was 5 mm with cooling water at a temperature of 2° C.

Water quenching unit B (two-stage slits)

The first-stage slit had a height of 50 mm and a width of 2 mm and the water level of the water pool above the slit was 5 mm. The second-stage slit had a height of 10 mm and a width pf 4 mm and the water level of the water pool above the slit was 10 mm with cooling water at a temperature of 10° C.

resin sheet out of a T-die of 730 mm width and a die lip opening of 1.5 to 3 mm provided with a die lip heater and mounted on an extruder machine having a diameter of 90 mm with L/D=28. The thus extruded molten resin sheet was quenched by continuously introducing into a water quenching unit equipped with two-stage slits, of which the first-stage slit had a height of 50 mm and a width of 2.5 mm and the water level of the water pool above the first-stage slit was 5 mm with cooling water at 5° C. while the second-stage slit had a height of

TABLE 1

|  |  | Example |  |  |  |  |  |  | Comparative Example 1 |
|---|---|---|---|---|---|---|---|---|---|
|  |  | 1 | 2 | 3 | 4 | 5 | 6 | 7 |  |
| Sheet molding | Quenching unit | B | B | B | B | B | B | A | B |
|  | Rate of extrusion, m/minute | 20 | 20 | 20 | 20 | 20 | 20 | 10 | 20 |
|  | Thickness, mm | 0.45 | 0.36 | 0.35 | 0.33 | 0.32 | 0.31 | 0.35 | 0.30 |
|  | Haze, % | 19 | 17 | 17 | 16 | 15 | 15 | 25 | 15 |
| Stretching | Stretch ratio | 1.50 | 1.20 | 1.15 | 1.10 | 1.05 | 1.03 | 1.15 | — |
|  | Haze, % | 9 | 8 | 7 | 7 | 6 | 6 | 13 | — |
|  | Shrinking stress, kg/cm$^2$ | — | — | 15.0 | — | — | 0.3 | — | — |
| Forming of container | Type of thermoforming | *1 | *1 | *2 | *2 | *1 | *1 | *2 | *2 |
|  | Thickness of container wall, mm | 0.17 | 0.18 | 0.15 | 0.16 | 0.17 | 0.16 | 0.16 | 0.17 |
|  | Haze, % | 2 | 2 | 3 | 2 | 3 | 2 | 7 | 5*3 |

*1 The container was shaped by pressure forming using a metal mold having 10 cavities each in a semi-ellipsoidal form having a depth of 15 mm and an opening of 25 mm by 15 mm under conditions of a hot plate temperature of 140° C. and a forming pressure of 4 kg/cm$^2$.
*2: *2 The container was shaped by vacuum forming using a metal mold having 10 cavities each in a semi-ellipsoidal form having a depth of 10 mm and an opening of 25 mm by 15 mm at a sheet temperature of 157° C.
*3 Crimps were formed on the container to impart a poor appearance thereto.
**Stretch ratio (sheet) - Thermoformability
In example 2 instead of the pressure forming, vacuum forming was undertaken at a forming temperature of 155° C. without success. Containers could be shaped by increasing the molding temperature to 165° C. although the container were very poor in the transparency and surface gross.

EXAMPLE 8

The experimental procedure was substantially the same as in Example 1 except that the isotactic polypropylene was replaced with a high-density polyethylene having a density of 0.960 g/cm$^3$, melting point of 130° C. and melt index of 0.2 g/10 minutes and the temperature of the resin sheet under stretching was 110° C. to give a polyethylene sheet having excellent transparency.

COMPARATIVE EXAMPLE 1

The experimental procedure was substantially the same as in Example 3 except that the step of stretching was omitted. Table 1 also gives the results obtained in the evaluation of the formability of the resin sheet and the quality of the thermoforming container.

EXAMPLE 9

The water-quenched resin sheet in Example 1 was preheated at 140° C. and then subjected to rolling in a rolling ratio of 1.2 by passing through a pair of pressure rollers heated at 110° C. The thus obtained rolled sheet was free from curling, crimps, slackening, die lines and microfisheyes in comparison with the same sheet before rolling and excellent in apperance and transparency with a haze value of 7%.

EXAMPLES 10 TO 16

A homopolymeric polypropylene resin having a density of 0.91 g/cm$^3$, melting point of 165° C. and melt index of 2.1 g/10 minutes was melted and extruded at a resin temperature of 240° C. into a transparent molten 10 mm and a width of 5 mm and the water level of the water pool above the second-stage slit was 10 mm with cooling water at 5° C. The conditions of extrusion were varied so that the thus quenched polypropylene sheets were varied in thickness. Each of the thus obtained polypropylene sheets was subjected to a heat treatment by passing through a heat-treatment unit composed of 4 rollers each having a diameter of 300 mm and heated at 145° C. followed by rolling in a roll ratio of 1.1 by passing through a pair of pressure rollers each having a diameter of 200 mm and heated at 120° C. to give polypropylene sheets for thermoforming having different values of thickness as shown in Table 2. These sheets were subjected to the measurements of the haze value and physical properties to give the results shown in Table 2. No curling and crimps were found in these sheets.

With an object to evaluate the thermoformability of these resin sheets and the transparency of the containers thermoformed thereof, each of the sheets was fabricated into approximately cylindrical containers having a diameter of 50 mm and a varied depth by several different molding methods indicated in Table 2 which summarizes the results obtained in the evaluation of the formability of the resin sheets and the measurements of the properties of the containers.

COMPARATIVE EXAMPLE 2

The experimental procedure was substantially the same as in Example 12 except that the heat treatment and the rolling treatment were omitted. The results of the evaluation undertaken in the same manner as in Example 12 are shown in Table 2.

TABLE 2

|  |  | Example | | | | | | | Comparative Example 2 |
|---|---|---|---|---|---|---|---|---|---|
|  |  | 10*1 | 11 | 12 | 13 | 14 | 15 | 16 |  |
| Sheet | Thickness, mm | 0.4 | 0.4 | 0.55 | 0.55 | 0.60 | 0.80 | 1.00 | 0.55 |
|  | Haze, Total | 5.7 | 5.7 | 16.3 | 16.3 | 22.3 | 54.8 | 74.8 | 34.2 |
|  | % Internal | 4.7 | 4.7 | 15.9 | 15.9 | 21.0 | 54.1 | 73.2 | 33.6 |
|  | External | 1.0 | 1.0 | 0.4 | 0.4 | 1.3 | 0.7 | 1.6 | 0.6 |
| Properties of sheet (MD/TD) | Tensile strength, kg/cm$^2$ | 555/ 470 | 555/ 470 | 548/ 473 | 548/ 473 | 496/ 473 | 489/ 477 | 493/ 475 | 430/ 438 |
|  | Ultimate elongation, % | 400/ 460 | 400/ 460 | 410/ 440 | 410/ 440 | 430/ 430 | 430/ 450 | 430/ 430 | 425/ 480 |
|  | Tensile modulus, kg/cm$^2$ | 19000/ 18000 | 19000/ 18000 | 19000/ 19000 | 19000/ 19000 | 19000/ 19000 | 19000/ 18000 | 19000/ 19000 | 10800/ 10600 |
| Conditions of thermoforming & results | Shaping method | *2 | *3 | *2 | *3 | *3 | *3 | *3 | *2 |
|  | Depth of shaped body, mm | 13 | 13 | 25 | 25 | 50 | 100 | 100 | 25 |
|  | Formability | *4 | Good | *4 | Good | Good | Good | Good | *4 |
| Properties of container | Side wall Thickness, mm | 0.25 | 0.22 | 0.23 | 0.16 | 0.13 | 0.15 | 0.19 | 0.25 |
|  | Haze, % | 2.3 | 2.8 | 5.3 | 6.5 | 8.2 | 8.3 | 9.1 | 10.1 |
|  | Bottom Thickness, mm | 0.19 | 0.20 | 0.16 | 0.19 | 0.16 | 0.21 | 0.25 | 0.14 |
|  | Haze, % | 1.8 | 2.3 | 1.9 | 2.1 | 2.0 | 2.5 | 3.6 | 5.8 |

*1Extrusion velocity in sheet preparation: 16 meters/minute; average flow velocity of cooling water in slit: 59 meters/minute.
*2Vacuum forming with the sheet heated at 153 to 158° C.
*3Plug pressure forming with the sheet heated at 135 to 140° C. under a pressure of 3 kg/cm$^2$.
*4Somewhat smaller thickness at bottom.

What is claimed is:

1. A method for the preparation of a crystalline polypropylene-based resin sheet having excellent transparency which comprises:
   (a) extruding a molten crystalline thermoplastic resin into a sheet;
   (b) quenching the extruded resin sheet by passing said resin sheet through a slit where cooling water is flowing in contact with said resin sheet and in the same direction thereby quenching said resin sheet, said cooling water flowing through said slit at a higher velocity than the velocity of said resin sheet through said slit to provide a quenched resin sheet; and
   (c) heating said quenched resin sheet at a temperature from 10° to 60° below the melting point of said resin to heat treat said quenched resin sheet;
   (d) stretching said quenched and heat treated resin sheet at a temperature of from 5° to 70° lower than the melting point of the resin, the stretch ratio being from 1.02 to 1.2 times.

2. The method of claim 1 wherein the quenching of the extruded molten resin sheet is performed by sequentially passing said resin sheet through two slits, in each of which said sheet is contacted with cooling water flowing in cocurrent flow.

3. The method of claim 1, wherein said propylene resin has a melt index of from 0.2 to 20 g/10 minutes.

4. The method of claim 3, wherein the quenching step (b) is carried out by sequentially passing said resin sheet through two slits, in each of which said sheet is contacted with cooling water flowing in cocurrent flow.

5. The method of claim 4, wherein said quenched resin sheet is heat treated at a temperature of from 20° to 50° C. lower than the melting point of said resin and then stretched at a temperature of from 5° to 50° C. lower than the melting point of said resin.

6. The method of claim 5, wherein said propylene resin has a melt index of from 0.3 to 15 g/10 minutes.

7. The method of claim 1, wherein said propylene resin has a melt index of from 0.3 to 15 g/10 minutes, and said quenched resin sheet is stretched at a temperature of from 5° to 50° C. lower than the melting point of said resin.

8. The method of claim 1, wherein said quenched resin sheet is heat treated at a temperature of from 10° to 50° C. below the melting point of the resin in the heat treating step (c).

* * * * *